United States Patent [19]

Taylor et al.

[11] Patent Number: 5,475,795
[45] Date of Patent: Dec. 12, 1995

[54] NEURAL PROCESSING DEVICES FOR HANDLING REAL-VALUED INPUTS

[75] Inventors: John G. Taylor; Denise Gorse; Trevor G. Clarkson, all of London, United Kingdom

[73] Assignees: University College London; King's College London, both of London, United Kingdom

[21] Appl. No.: 966,028

[22] PCT Filed: Jun. 28, 1991

[86] PCT No.: PCT/GB91/01054

§ 371 Date: Dec. 22, 1992

§ 102(e) Date: Dec. 22, 1992

[87] PCT Pub. No.: WO92/00573

PCT Pub. Date: Jan. 9, 1992

[30] Foreign Application Priority Data

Jun. 29, 1990 [GB] United Kingdom .................... 9014569

[51] Int. Cl.⁶ .................................................. G06F 15/18
[52] U.S. Cl. .................................. 395/27; 395/24; 395/22
[58] Field of Search .................................. 395/27, 24, 22; 367/129; 364/470

[56] References Cited

U.S. PATENT DOCUMENTS

| | | | |
|---|---|---|---|
| 3,327,291 | 6/1967 | Lee | 395/24 |
| 3,613,084 | 10/1971 | Armstrong | 395/27 |
| 4,031,501 | 6/1977 | Caruso | 367/129 |
| 4,040,094 | 8/1977 | Everett et al. | 358/283 |
| 4,045,659 | 8/1977 | Akagawa et al. | 364/470 |
| 4,518,866 | 5/1985 | Clymer | 395/27 |
| 4,807,168 | 2/1989 | Moopenn et al. | 395/27 |
| 4,809,222 | 2/1989 | Van Den Heuvel | 365/45 |
| 4,972,363 | 11/1990 | Nguyen et al. | 364/807 |
| 4,996,648 | 2/1991 | Jourjine | 395/27 |
| 5,063,521 | 11/1991 | Peterson et al. | 395/27 |
| 5,148,385 | 9/1992 | Frazier | 395/27 |
| 5,175,798 | 12/1992 | Taylor et al. | 395/27 |

OTHER PUBLICATIONS

Milligan et al., "RAM-unit Learning Networks", IEEE First Intl. Conf. Neural Networks, Jun. 1987, pp. II-557 to II-565.

*Parallel Processing in Neural Systems and Computers*, "Training Stretegies for probabilistic RAMS" pp. 161–164, Mar. 19–21, 1990.

*New Electronics* vol. 23, No. 1, Jan. 1990, by Boothroyd: "Ram Chips Build Simple Quick Thinking Networks" see p. 17.

IEEE First International Conference on Neural Networks, vol. 3. Jun. 21, 1987, by Nguyen: "Stochastic Processing in Neural Netrwork Application", pp. Cover Sheet and III-283 to III-291.

*Parellel Processing in Neural Systems and Computers*; Mar. 19–21, 1990, by Massen: "Why Do Neural Network Researches Ignore Stochastic Computers?", pp. 23–26.

J. G. Taylor, "*Spontaneous Behavior in Neural Networks,*" J. Theor. Biol. 36, pp. 513–528 (1972).

(List continued on next page.)

*Primary Examiner*—George B. Davis
*Attorney, Agent, or Firm*—Darby & Darby

[57] ABSTRACT

A device for use in a neural processing network. The network includes a memory having a plurality of storage locations each having stored a number representing a probability. Each storage location is selectively addressable to cause the contents of the location to be read to an input of a comparator. A noise generator inputs to the comparator a random number representing noise. At an output of the comparator, an output signal appears having a first or second value depending on the values of the numbers received from the addressed storage location and the noise generator. The probability of the output signal has a given one of the first and second values determined by the number at the addressed location. The address inputs for the memory are derived from a real-to-spike frequency translator which has real values as its input vector.

20 Claims, 13 Drawing Sheets

OTHER PUBLICATIONS

W. K. Kan and I. Aleksander, "A Probabilistic Logic Neuron Network for Associative Learning", IEEE Proceedings of the First Int'l. Conference on Neural Networks, 1978, pp. 541–548 (8 pages).

D. Gorse and J. G. Taylor, "On the Equivalence and Properties of Noisy Neural and Probaslistic RAM Nets", Physics Letters A, vol. 131, No. 6, pp. 326–332, 1988.

I. Aleksander, "The Logic of Connectionist Systems", Neural Computing Architectures, ed. I. Aleksander, MIT Press, 1989, pp. 133–155 (23 pages).

D. Gorse and J. G. Taylor, "An Analysis of Noisy RAM and Neural Nets", Physica D34, pp. 90–114, 1989.

D. Gorse and J. G. Taylor, "Towards a Hardware Realisable Model of the Neuron", Models of Brain Function, ed. Rodney M. J. Cotterill, CUP (1989), pp. 465–482.

T. G. Clarkson, D. Gorse and J. G. Taylor, "Hardware Realisable Models of Neural Processing", Proceedings of the First IEEE International Conference on Artificial Neural Networks, 1989, pp. 242–246.

C. E. Myers, "Output Functions for Probabilistic Logic Nodes", Proceedings of the First IEEE International Conference on Artificial Neural Networks, 1989, pp. 310–314.

D. Gorse, "A New Model of the Neuron", New Developments in Neural Computing, eds. J. G. Taylor and C. L. T. Mannion, Adam Hilger (1989), pp. 111–118.

D. Martland, "Adaptation of Boolean Networks Using Back–Error Propagation", Brunel University Department of Computer Science Preprint, 1989, (7 pages).

P. C. Bressloff and J. G. Taylor, "Random Iterative Networks", Phys. Rev. A41, pp. 1126–1137 (1990)(22 pages).

D. Gorse and J. G. Taylor, "A General Model of Stochastic Neural Processing", Biol. Cybern, 63, pp. 299–306, 1990.

D. Gorse and J. G. Taylor, "Training Strategies for Probabilistic RAMs", Parallel Processing in Neural Systems and Computers eds. R. Eckmiller, G. Hartmann and G. Hauske, North–Holland, 1990, pp. 161–164 (4 pages).

D. Gorse and J. G. Taylor, "Training Strategies for Probabilistic RAMs", Proceedings of the Neural Computing Meeting (NCM '90), London, Apr. 1990, (7 pages).

D. Gorse and J. G. Taylor, "Hardware Realisable Learning Algorithms", Proceedings of INNC–90–Paris, Kluwer, 1990, pp. 821–824 (4 pages).

C. Myers, "Reinforcement Learning When Results are Delayed and Interleaved in Time", Proceedings of INN–C–90–Paris, Kluwer, 1990, pp. 860–863.

D. Gorse and J. G. Taylor, "Reinforcement Training Strategies for Probabilistic RAMs", Proceedings of Neuronet '90, Prague, Sep. 1990, pp. 98–100 (3 pages).

W. K. Kan, H. K. Wong and N. M. Law, "Non–Overlapped Trees of Probabilistic Logic Neurons", IEEE Region 10 Conference on Computer and Commiunications Systems, Hong Kong, Sep. 1990, pp. 37–39.

COMPARATOR

NEURAL PROCESSING DEVICES FOR HANDLING REAL-VALUED INPUTS

BACKGROUND OF THE INVENTION

This invention relates to artificial neuron-like devices (hereinafter referred to simply as "neurons") for use in neural processing.

One of the known ways of realising a neuron in practice is to use a random access memory (RAM). The use of RAMs for this purpose dates back a considerable number of years. Recently, a particular form of RAM has been described (see Proceedings of the First IEE International Conference on Artificial Neural Networks, IEE, 1989, No. 313, pp 242–246) which appears to have the potential for constructing neural networks which mimic more closely than hitherto the behaviour of physiological networks. This form of RAM is referred to as a pRAM (probabilistic random access memory). For a detailed discussion of the pRAM attention is directed to the paper identified above. However, a brief discussion of the pRAM is set out below, by way of introduction to the invention.

The pRAM is a hardware device with intrinsically neuron-like behaviour (FIG. 1). It maps binary inputs [5] (representing the presence or absence of a pulse on each of N input lines) to a binary output [4] (a 1 being equivalent to a firing event, a 0 to inactivity). This mapping from $\{0,1\}^N$ to $\{0,1\}$ is in general a stochastic function. If the $2^N$ address locations [3] in an N-input pRAM A are indexed by an N-bit binary address vector u, using an address decoder [6], the output $a \in \{0,1\}$ of A is 1 with probability $$\text{Prob}(a=1|i) = \Sigma \alpha_{\underline{u}} \prod_{j=1}^{N} (i_j u_j + \bar{i}_j \bar{u}_j) \quad (1)$$

where $i \in \{0,1\}^N$ is the vector representing input activity (and $\bar{x}$ is defined to be $1-x$ for any x). The quantity $\alpha_u$ represents a probability. In the hardware realisation of the device $\alpha_u$ is represented as an M-bit integer in the memory locations [3], having a value in the range 0 to $2^M-1$ and these values represent probabilities in the range $$\left\{ 0, \frac{1}{2^M}, \frac{2}{2^M}, \ldots, 1 - \frac{1}{2^M} \right\}.$$

The $\alpha_u$ may be assigned values which have a neurobiological interpretation: it is this feature which allows networks of pRAMs, with suitably chosen memory contents, to closely mimic the behaviour of living neural systems. In a pRAM, all $2^N$ memory components are independent random variables. Thus, in addition to possessing a maximal degree of non-linearity in its response function—a deterministic ($\alpha \in \{0,1\}^N$) pRAM can realise any of the $2^{2^N}$ possible binary functions of its inputs—pRAMs differ from units more conventionally used in neural network applications in that noise is introduced at the synaptic rather than the threshold level; it is well known that synaptic noise is the dominant source of stochastic behaviour in biological neurons. This noise, v, is introduced by the noise generator [1]. v is an M-bit integer which varies over time and is generated by a random number generator. The comparator [2] compares the value stored at the memory location being addressed and v. One way of doing this is to add the value stored at the addressed location to v. If there is a carry bit in the sum, i.e. the sum has M+1 bits, a spike representing a 1 is generated on arrival of the clock pulse [7]. If there is no carry bit no such spike is generated and this represents a 0. It can be seen that the probability of a 1 being generated is equal to the probability represented by the number stored at the addressed location, and it is for this reason that the latter is referred to as a probability. It should be noted that the same result could be achieved in other ways, for example by generating a 1 if the value of the probability was greater than v. It can also be noted that because pRAM networks operate in terms of 'spike trains' (streams of binary digits produced by the addressing of successive memory locations) information about the timing of firing events is retained; this potentially allows phenomena such as the observed phase-locking of visual neurons to be reproduced by pRAM nets, with the possibility of using such nets as part of an effective 'vision machine'.

For information concerning in particular the mathematics of the pRAM attention is directed to the paper written by the present inventors in the Proceedings of the First IEE International Conference in Artificial Neural Networks, IEE, 1989, No. 313, pp. 242–246, the contents of which are incorporated herein by reference.

FIG. 9 shows a simple neural network comprising two pRAMs denoted as RAM 1 and RAM 2. It will be understood that for practical applications much more extensive networks are required, the nature of which depends on the application concerned. Nevertheless, the network shown in FIG. 9 illustrates the basic principles. It will be seen that each pRAM has an output OUT and a pair of inputs denoted IN1 and IN2. Each output corresponds to the output [4] shown in FIG. 1. The output from RAM 1 is applied as an input IN1 of RAM 1, and the output from RAM 2 is applied as an input to the input IN2 of RAM 1. The output from RAM 1 is also applied as an input to the input IN2 of RAM 2, and the output of RAM 2 is applied as an output to the input IN1 of RAM 2. The network operates in response to clock signals received from the circuit labelled TIMING & CONTROL.

The circuitry of RAM 1 is shown in detail in FIGS. 10A–10D. RAM 2 is identical, except that for each reference in FIGS. 10A–10D to RAM 1 there should be substituted a reference to RAM 2 and vice versa.

RAM 1 comprises a random number generator. This is of conventional construction and will therefore not be described here in detail. The embodiment shown here employs shift registers and 127 stages are used to give a sequence length of $2^{127}-1$. It will be noted that the random number generator has an array of three EXOR gates having inputs 2, 3 and 4 which can be connected to selected ones of the taps T of the shift registers. The taps selected in RAM 1 will be different to those selected in RAM 2 and appropriate selection, according to criteria well known to those in the art, avoids undesired correlation between the random numbers generated by the two generators. The output of the random number generator is an 8-bit random number which is fed as two 4-bit segments to two adders which make up a comparator.

The illustrated embodiment has a memory which holds four 8-bit numbers held at four addresses. The memory is thus addressed by 2-bit addresses. At each operation of the network the contents of the addressed storage location in the memory are fed to the comparator where they are added to the random number generated at that time. The output of the comparator is a '1' is the addition results in a carry bit and is a '0' otherwise.

The output of the comparator is fed to the output of the RAM (which is labelled OUT in FIG. 9) and also to a latch.

Here it is held ready to form one bit of the next address to be supplied to the address decoder via which the memory is addressed. As can be seen by taking FIGS. 9 and 10A–10D together, the other bit of the address (i.e. that supplied to input IN2 of RAM 1) is the output of RAM 2.

FIGS. 10A–10D also show inputs labelled R1__LOAD and MEMORY DATA (FIG. 10D) which enable the system to be initialised by loading data into the memory at the outset, and an input SCLK by means of which clock pulses are supplied to RAM 1 from a clock generator (see below). Finally as regards FIGS. 10A–10D, there is an input denoted GENERATE which is connected to the latch via an inverter gate which serves to initiate the production of a new output from the pRAM and allows a set of 8 SCLK pulses to occur. The clock generator shown in FIG. 11 is of conventional construction and will therefore not be described in detail, its construction and operation being self-evident to a man skilled in the art from the Figure. This provides a burst of 8 clock signals at its output SCLK which is supplied to the timing input of each of RAM 1 and RAM 2. Each time a GENERATE pulse occurs, each of RAM 1 and RAM 2 generates a new 8-bit random number (one bit for each SCLK pulse), addresses a given one of the four storage locations in its memory, compares the random number with the contents of the addressed location with the random number, and generates an output accordingly.

The pRAM thus far described has no learning or training rule associated with it. The provision of a particularly advantageous form of training is claimed in our copending application filed on even date herewith under the title "Neural processing devices with learning capability." This will now be discussed.

Reinforcement training is a strategy used in problems of adaptive control in which individual behavioural units (here to be identified with pRAMs) only receive information about the quality of the performance of the system as a whole, and have to discover for themselves how to change their behaviour so as to improve this. Because it relies only on a global success/failure signal, reinforcement training is likely to be the method of choice for 'on-line' neural network applications.

A form of reinforcement training for pRAMs has been devised which is fast and efficient (and which is capable, in an embodiment thereof, of being realised entirely with pRAM technology). This training algorithm may be implemented using digital or analogue hardware thus making possible the manufacture of self-contained 'learning pRAMs'. Networks of such units are likely to find wide application, for example in the control of autonomous robots. Control need not be centralised; small nets of learning pRAMs could for example be located in the individual joints of a robot limb. Such a control arrangement would in many ways be akin to the semi-autonomous neural ganglia found in insects.

According to the invention of our copending application there is provided a device for use in a neural processing network, comprising a memory having a plurality of storage locations at each of which a number representing a probability is stored; means for selectively addressing each of the storage locations to cause the contents of the location to be read to an input of a comparator; a noise generator for inputting to the comparator a random number representing noise; means for causing to appear at an output of the comparator an output signal having a first or second value depending on the values of the numbers received from the addressed storage location and the noise generator, the probability of the output signal having a given one of the first and second values being determined by the number at the addressed location; means for receiving from the environment signals representing success or failure of the network; means for changing the value of the number stored at the addressed location if a success signal is received in such a way as to increase the probability of the successful action; and means for changing the value of the number stored at the addressed location if a failure signal is received in such a way as to decrease the probability of the unsuccessful action. The number stored at the addressed location may be changed by an appropriate increment or decrement operation, for example.

A preferred form of training rule is described by the equation $$\Delta\alpha_u(t)=\rho((a-\alpha_u)r+\lambda(a-\alpha_u)p)(t).\delta(u-i(t)) \qquad (2)$$

where $r(t)$, $p(t)$ are global success, failure signals $\in \{0,1\}$ received from the environment at time t, the environmental response might itself be produced by a pRAM, though it might be produced by many other things. $a(t)$ is the unit's binary output, and $\rho$, $\lambda$ are constants. The delta function is included to make it clear that only the location which is actually addressed at time t is available to be modified, the contents of the other locations being unconnected with the behaviour that led to reward or punishment at time t. When r=1 (success) the probability $\alpha_u$ changes so as to increase the chance of emitting the same value from that location in the future, whilst if p=1 (failure) the probability of emitting the other value when addressed increases. The constant $\lambda$ represents the ratio of punishment to reward; a non-zero value for $\lambda$ ensures that training converges to an appropriate set of memory contents and that the system does not get trapped in false minima. Note that reward and penalty take effect independently; this allows the possibility of 'neutral' actions which are neither punished or rewarded, but may correspond to a useful exploration of the environment.

DESCRIPTION OF THE PREFERRED EMBODIMENT

Figure 1:
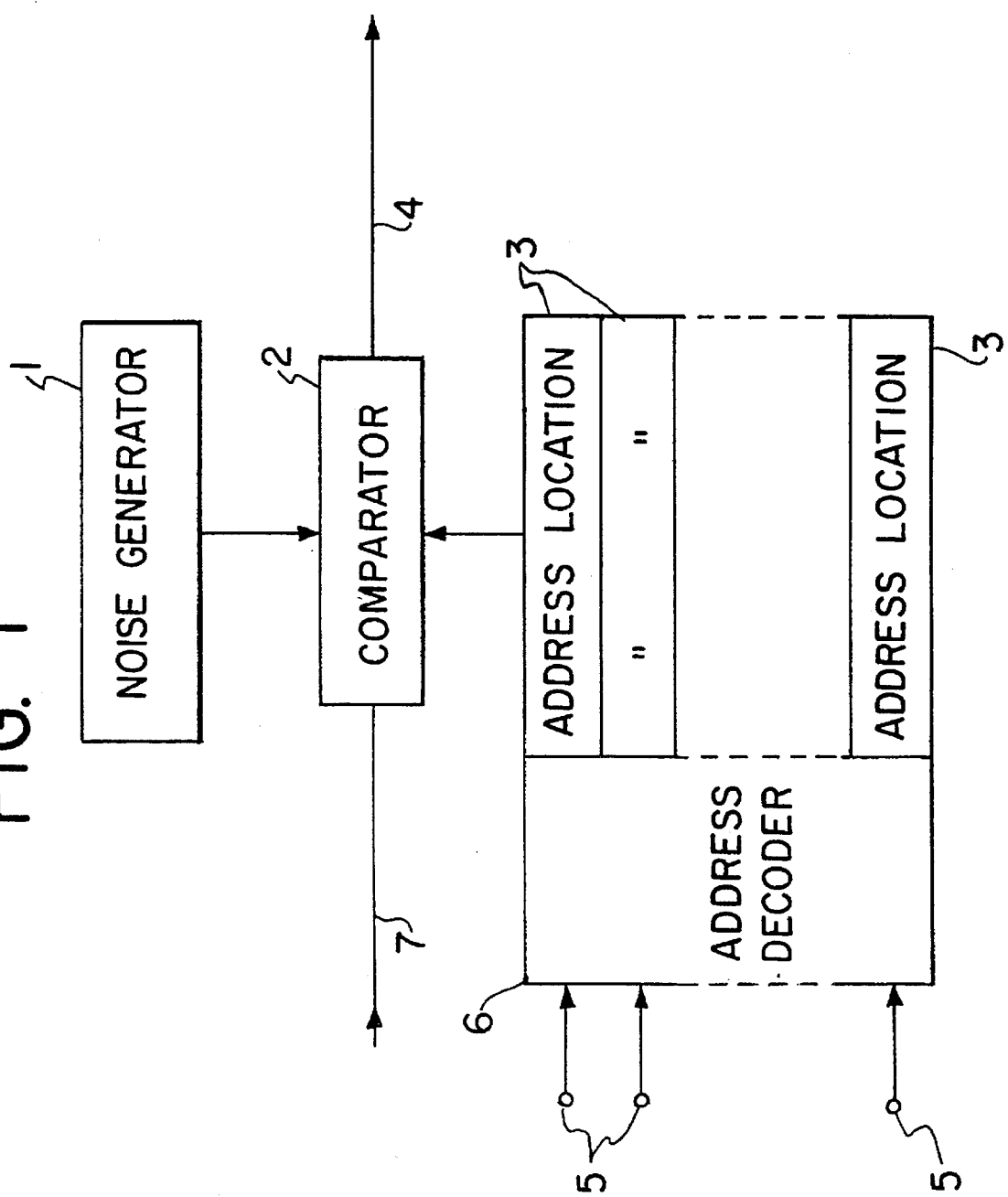
FIG. 1 shows diagrammatically a pRAM, as described above.
Figure 2:
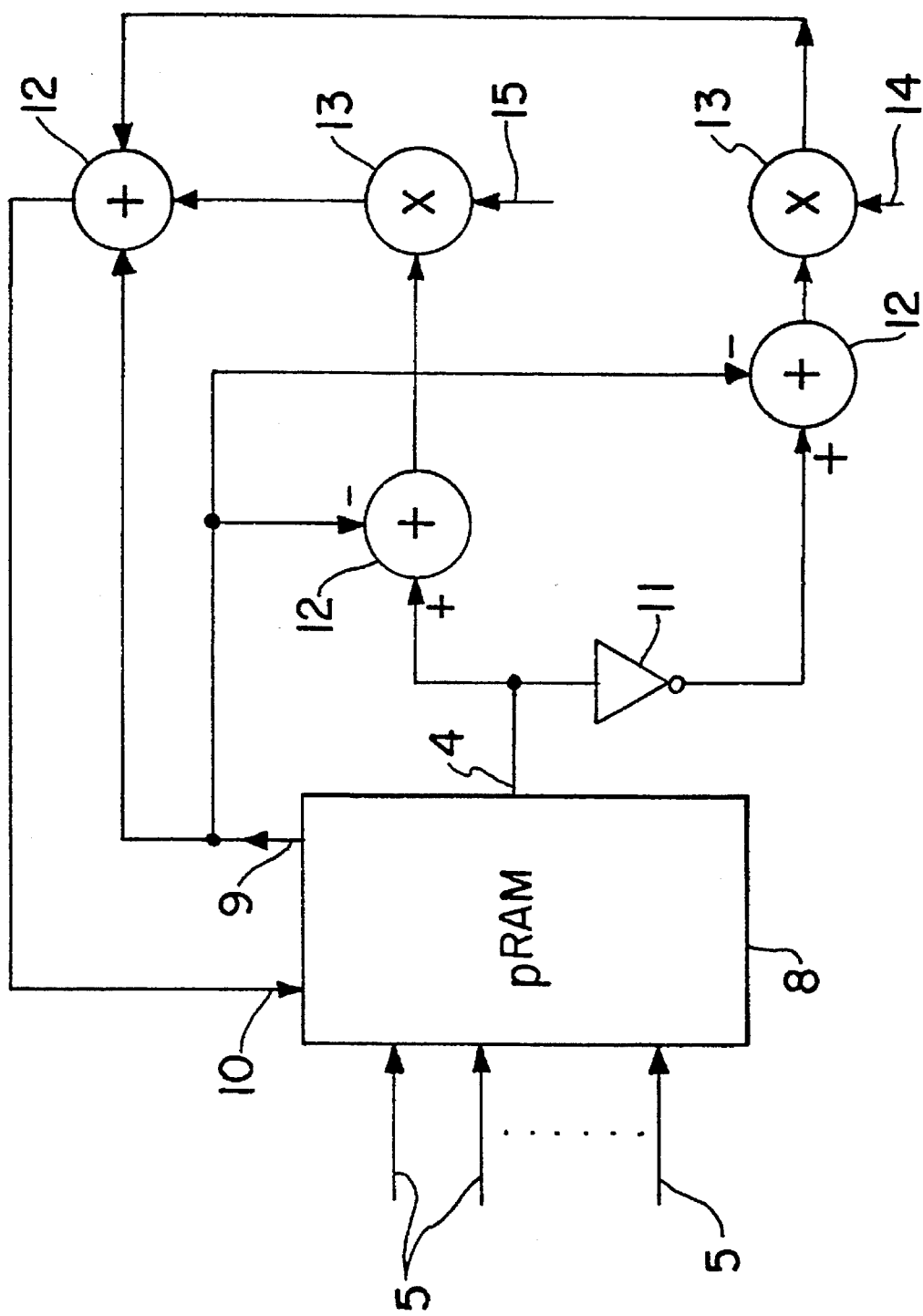
FIG. 2 shows diagrammatically a pRAM having learning characteristics.

FIG. 2 shows one way in which rule (2) can be implemented in hardware. The memory contents $\alpha_i(t+1)$ are updated each clock period according to rule (2). The pRAM [8] is identical to the unit shown in FIG. 1 and described in the text above. For a given address on the address inputs [5], an output spike is generated as described above. The terms a−$\alpha_u$ and ā−$\alpha_u$ are produced using the inverter [11] and the adder/subtractors [12] where $\alpha_u$ is read from the pRAM memory port [9]. These terms are multiplied by the reward and penalty factors ρr [14] and ρλp [15] respectively using the multipliers [13]. The resultant reward/penalty increment is added to the value stored at the location being addressed [9] using a further adder [12] and is then written back into the memory using the write port [10].

The learning rule (2) achieves a close approximation to the theoretically expected final values of the memory contents for a suitably small value of the learning rate constant ρ. However, this may lead to a lengthy time for training. To increase the training speed, ρ may be initially set to a large value and subsequently decremented at each successive time step by a factor which vanishes suitably fast as the number of steps increases.

Figure 3:
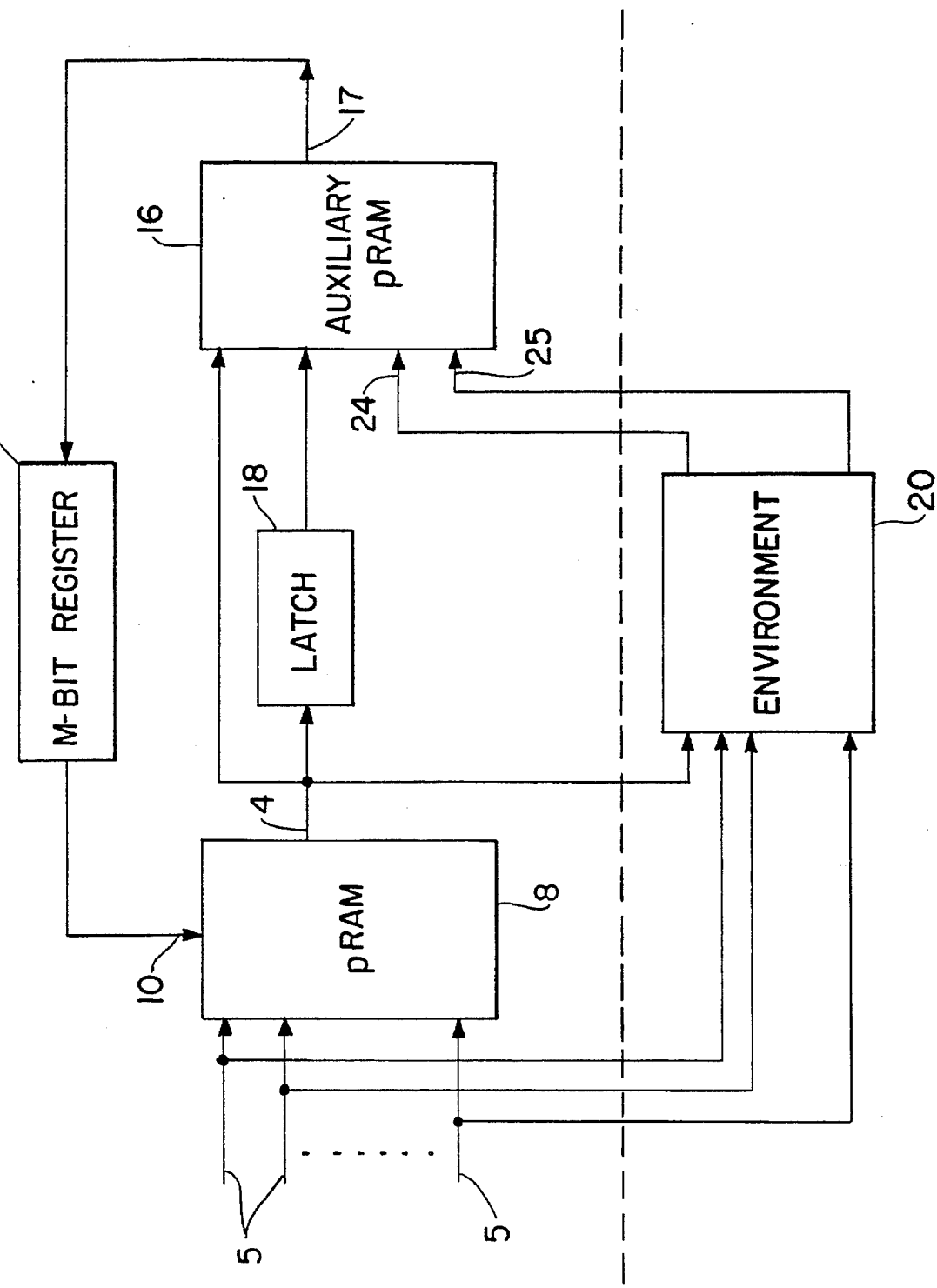
FIG. 3 shows an alternative pRAM having learning characteristics.

The rule (2) may also be realised in hardware using a pRAM technology (FIG. 3). The advantages of this method is that multiplier circuits are not required. However, this requires $2^M$ cycles to generate $\alpha_i(t+1)$ where M is the number of bits used to represent $\alpha_u$. It is implementable, in this example, by an auxiliary 4-input pRAM [16] (FIG. 3) with input lines carrying $\alpha_i(t)$, a(t), r(t) and p(t), (the order of significance of the bits carried by lines going from $\alpha_i$ to p) and with memory contents given by $$\beta=(0,0,0,0,\rho\lambda,0,0,1-\rho\lambda,0,1-\rho,\ \rho,1,\rho\lambda,1-\rho,\rho,1-\rho\lambda) \quad (3)$$

Because $\alpha_i(t) \in [0,1]$, and pRAMs are neuron-like objects which communicate via discrete pulses, it is necessary to use time-averaging (over a number of cycles, here denoted by R) to implement the update. The output [17] of the auxiliary pRAM [16] in each step consists of the contents of one of two locations in pRAM [16], since a, r and p remain the same and only $\alpha_i$ alters between 0 and 1. The output of the pRAM [16] accumulated over R time steps using the integrator [19] is the updated memory content $\alpha_i(t+1)\equiv\alpha_i(t)+\Delta\alpha_i(t)$, where $\Delta\alpha_i(t)$ is given by (2). The memory location is updated with the integrator output using the write memory port [10]. It is simplest to set $R=2^M$, where M is the number of bits used to represent the $\alpha_u$'s. The steps used in the update are 0. Set contents of M-bit register [19] to zero.

1. Record i (t) (location addressed), a(t) (using the latch [18], and r(t) and p(t) (the reward [24] and penalty [25] signals). [20] represents the 'environment' which provides the reward and penalty signals.

2. For the next R time step repeatedly address the same location i in pRAM [8] (to produce the spike train $\alpha_i$). Let these pulses, together with the recorded a, r and p, generate spikes from locations in the auxiliary pRAM [16] and accumulate these values in the integrator [19].

3. [19] now contains an M-bit approximation to $\alpha_i(t+1)$.

Copy this into location i of pRAM [8] using port [10]. When the pRAM is implemented using analogue circuitry, [19] becomes an integrator which is first cleared and then integrates over R time steps. The output after this period is then written into the pRAM address i. This is functionally identical to the description of the digital device above.

The ability to let the learning rate, ρ, decrease with time, as described in association with FIG. 2, may also be included in the method of FIG. 3.

There are many interesting problems of adaptive control which require real-valued inputs. An object of the invention is to provide a modified pRAM which enables such inputs to be handled.

According to the present invention in its preferred form there is provided a device for use in neural processing network comprising a memory having a plurality of storage locations at each of which a number representing a probability is stored, the memory having a plurality of address lines to define a succession of storage location addresses; a comparator connected to receive as an input the contents of each of the successively addressed locations; a noise generator for inputting to the comparator a succession of random numbers, representing noise; and means for causing to appear at the output of the comparator a succession of output signals each having a first or second value depending on the values of the numbers received from the addressed storage locations and the noise generator, the probability of the output signal having a given one of the first and second values being determined by the number at the addressed location; characterized in that it comprises a real-number to digital converter which receives a plurality of real-valued numbers each in the range of 0 to 1 and produces at its output a corresponding plurality of synchronised parallel pulse trains which are applied to the respective address lines of the memory to define the storage location addresses, the probability of a pulse representing a 1 being present in an address on a given address line being equal to the value of the real-valued number from which the pulse train applied to that address line was derived; and an integrator for integrating the output signals from the comparator.

Figure 4:
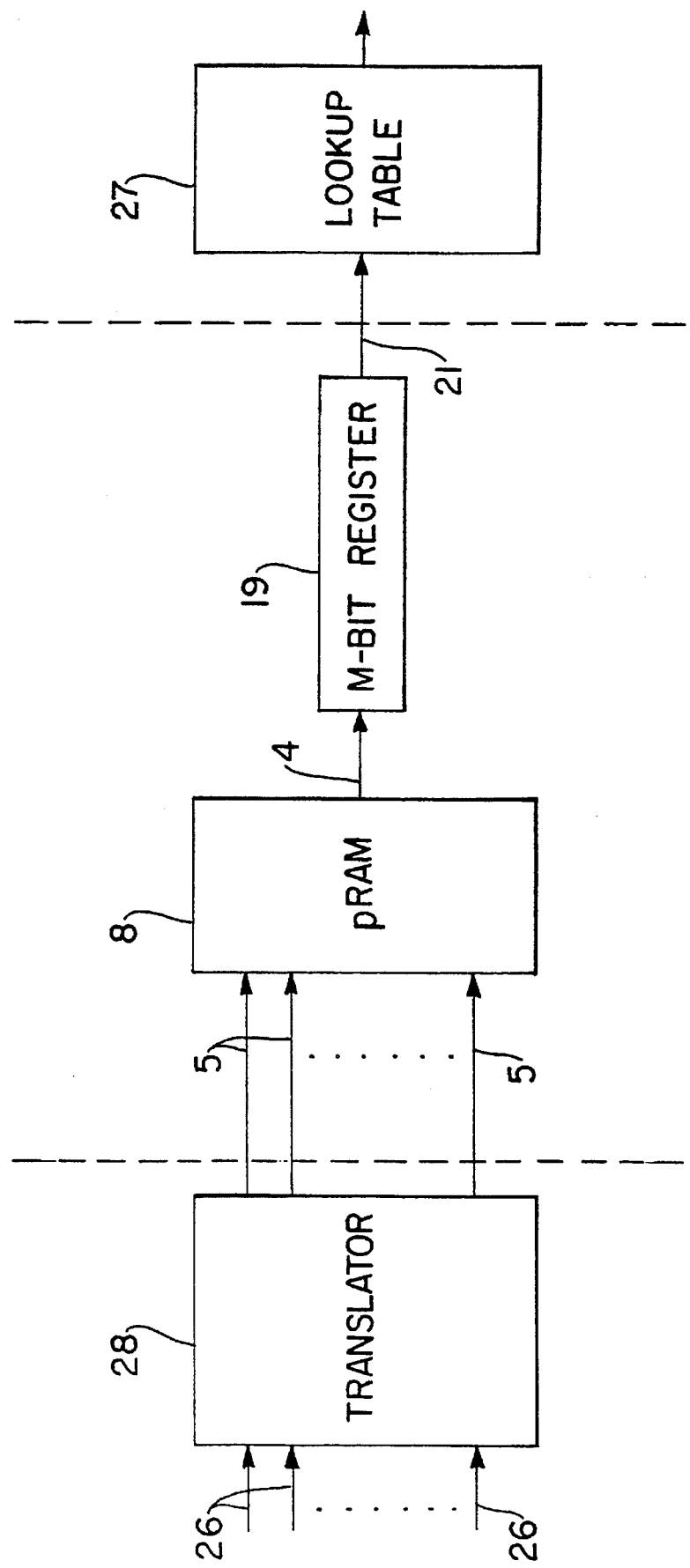
FIG. 4 shows diagrammatically a pRAM adapted to handle real-valued input.

The device provided by the invention performs mappings from $[0,1]^N$ to $\{0,1\}$ using ideas of time-averaging similar to those used above to implement the reinforcement training rule (2). It is referred to herein as an integrating pRAM or i-pRAM, and is shown in FIG. 4. Thus a real-valued input vector [26] x $\in[0,1]^N$ is approximated by the time-average (over some period R) of successive binary input patterns i $\in\{0,1\}^N$ (by the real-to-spike-frequency translator [28]:

$$xj = \frac{1}{R} \sum_{r=1}^{R} i_j(r) \quad (4)$$

Thus, each of the lines [26] which makes up the vector carries a real value in the range 0 to 1. For each line [26] there is a corresponding address input [5], and this carries a train of pulses in which the probability of there being, at any given instant, a pulse representing a 1 is equal to the real value on the corresponding line [26]. To put the matter another way, the time average of the pulse train carried by a given line [5] is equal to the value on the corresponding line [26]. The pulse trains on the lines [25] are synchronised with one another. The translator [28] might take various forms, and one possibility is for the translator [28] to be a pRAM itself.

At each time step r=1 . . . R, i(r) selects a particular location in the pRAM [8] using the address inputs [5], resulting in a binary output at [4] denoted herein as â(r).

These outputs are accumulated in a spike integrator [19] (see FIG. 4) whose contents were reset at the start of this cycle. The integrator [19] comprises a counter which counts the number of 1's received over a fixed interval, and, if there is no lookup table [27], for which see below, a device for generating a binary output [21] in dependence on the number counter. This device may itself operate in the manner of a pRAM with a single storage location, i.e. a random number can be added to the contents of the counter and a 0 or 1 generated depending on whether there is an overflow bit. After R time steps the contents of [19] are used to generate the binary i-pRAM output [21], which is 1 with probability $$\text{Prob}(a=1|\underline{x}) = \frac{1}{R} \sum_{r=1}^{R} \hat{a}(r) = \Sigma \alpha_{\underline{u}} \prod_{j=1}^{N} (x_j u_j + \overline{x_j} \overline{u_j}) \equiv \Sigma \alpha_{\underline{u}}^{-} X_{\underline{u}}^{-} \quad (5)$$

where $X_u$=Prob(u addressed) is the more general distribution function which replaces the delta function on the right hand side of (1).

As an alternative to averaging over a succession of fixed intervals, each beginning where the last ended, a moving average could be used with the output [21] being generated after the formation of each average.

For some applications it might be desirable to use a function of $$\Sigma \equiv \sum_{\underline{u}} \alpha_{\underline{u}} X_{\underline{u}}$$

to generate the binary output a:

$$\text{Prob}(a=1|x)=f(\Sigma) \quad (6)$$

f might for example be a sigmoid (with threshold θ and 'inverse temperature' β):

$$f(\Sigma) = \frac{1}{1 + e^{-\beta(\Sigma-\theta)}} \quad (7)$$

In this case it would be necessary to appropriately transform the contents of the integrator [19] before using the i-pRAM output. This might be achieved locally in hardware by a lookup table, denoted by [27]. In this case the number of 1's counted by the spike generator [19] is used not to generate a 0 or 1 at the output of the generator [19] itself but as the address of a storage location in the lookup table [27], with each location in the lookup table containing a 0 or 1. Thus the output of the lookup table [27] is a 0 or 1 when addressed by the output of the generator [19].

The i-pRAM just described can be developed further to implement a generalised form of the training rule (2). According to rule (2), the input of a single binary address results in the contents of the single addressed location being modified. However, the i-pRAM can be used to implement a generalised form of the training rule (2) in which the input of a real-valued number causes the contents of a plurality of locations to be modified. This is achieved by using an address counter for counting the number of times each of the storage locations is addressed, thus providing what will be referred to herein as a learning i-pRAM. This generalised training rule is $$\Delta \alpha_u(t) = \rho((a-\alpha_u)r + \lambda(\overline{a}-\alpha_u)p)(t) \cdot X_u(t) \quad (8)$$

where $$X_{\underline{u}}(t) = \prod_{j=1}^{N} (x_j u_j + \overline{x_j} \overline{u_j})$$

replaces the delta function in (2). Thus in the learning i-pRAM case, every location [3] is available to be updated, with the change proportional to that address's responsibility for the ultimate i-pRAM binary output a(t) (obtained using the algorithm of equation (2).

Figure 5:
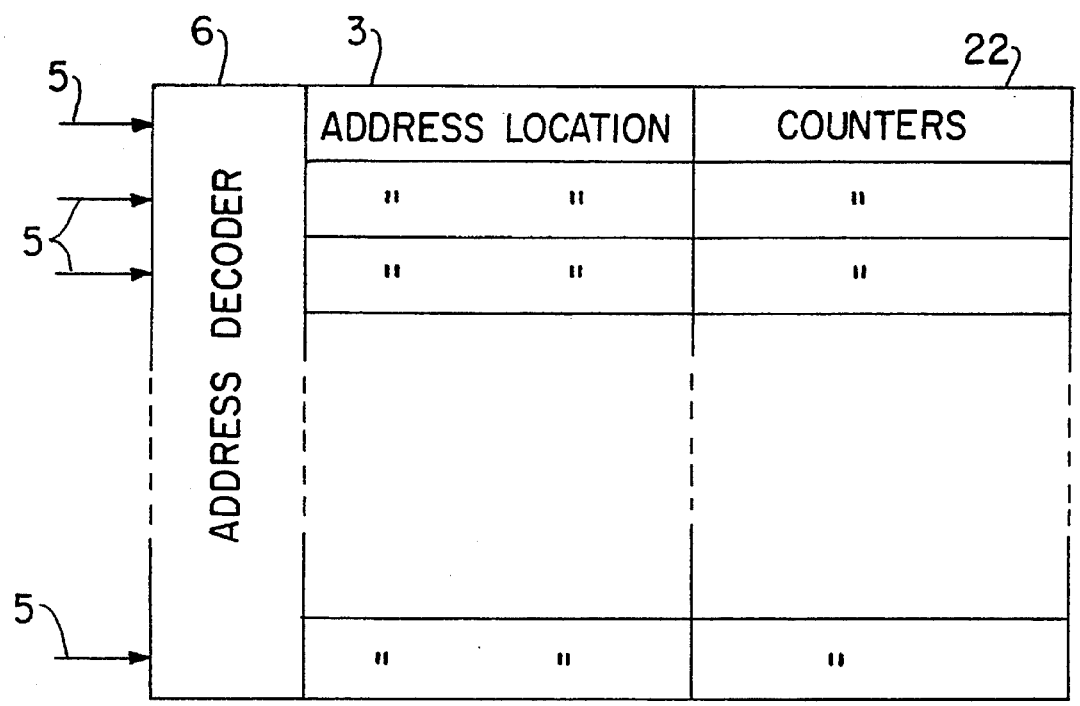
FIG. 5 shows diagrammatically a pRAM having the ability to implement a more generalised learning rule than that employed in FIG. 2.

The $X_u$'s record the frequency with which addresses have been accessed. A simple modification to the memory section of the pRAM (FIG. 1) allows the number of times each address is accessed to be recorded using counters or integrators [22] as shown in FIG. 5.

The $X_u$'s could also be recorded in an auxiliary N-input pRAM, and used to modify the memory contents in a similar manner to FIG. 3. However, this method takes $2^N$ times longer than that using the architecture of FIG. 5.

For similar reasons to those considered in connection with FIGS. 2 and 3, training may be accelerated by letting the learning rate constant, ρ, have an initially high value and tend to zero with time, this being achieved in a similar manner to that described above.

Figure 6:
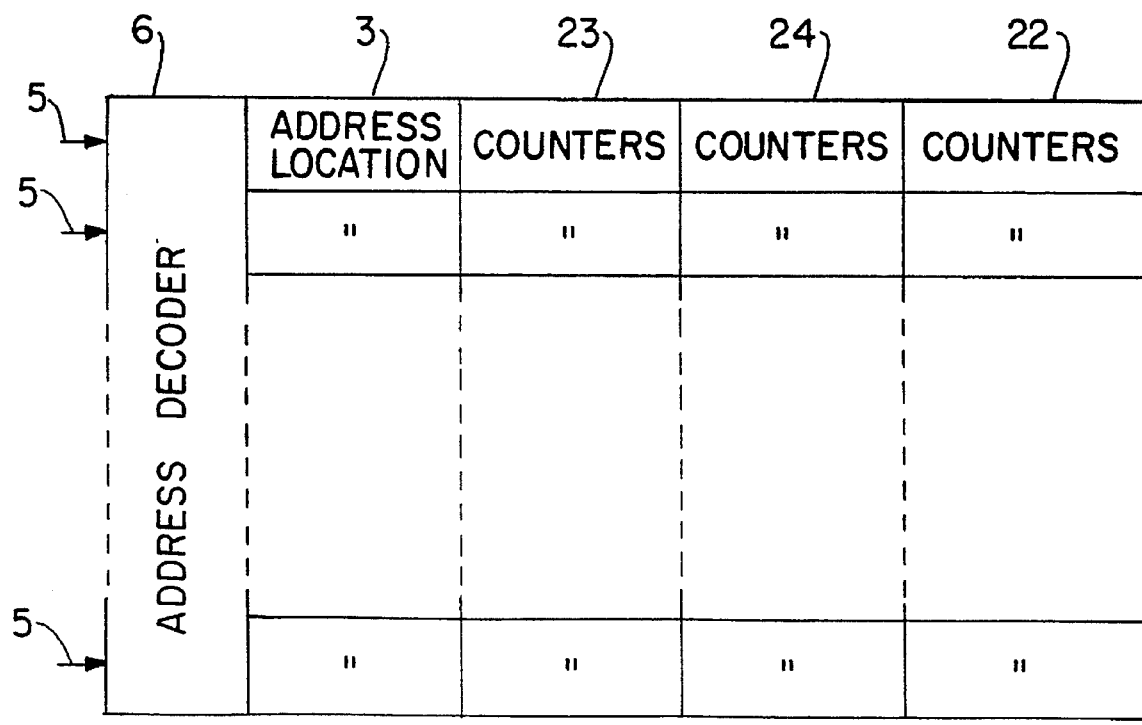
FIG. 6 shows diagrammatically a pRAM in which eligibility traces (explained below) are added to each memory location.
Figure 7:
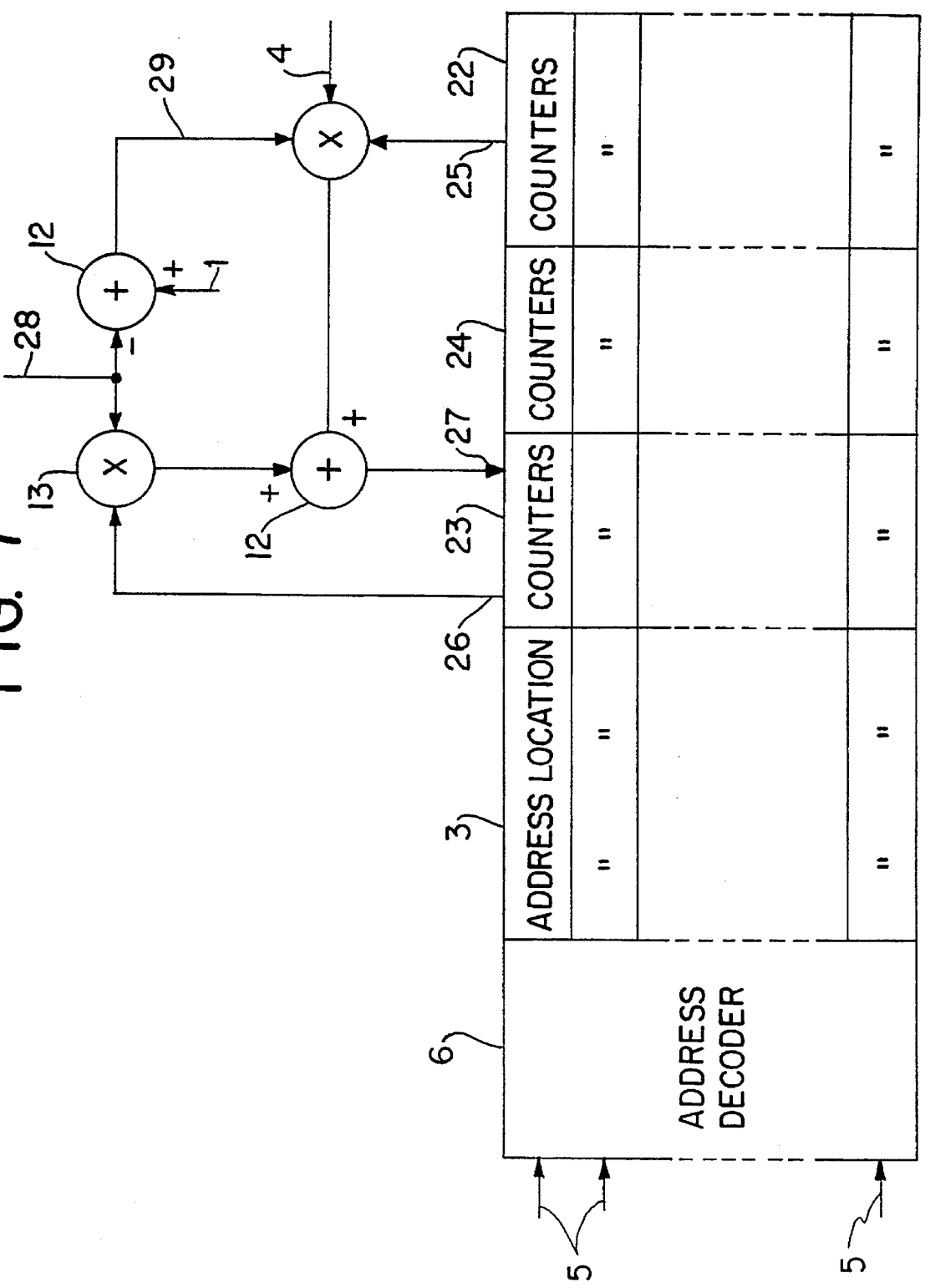
FIG. 7 shows how a pRAM with eligibility traces can be used to implement Equation 9(a) (for which see below)

Rule (8) may be further generalised in order to deal with situations in which reward or punishment may arrive an indefinite number of time steps after the critical action which caused the environmental response. In such delayed reinforcement tasks it is necessary to learn path-action, rather than position-action associations. This can be done by adding eligibility traces to each memory location as shown in FIG. 6. These decay exponentially where a location is not accessed, but otherwise are incremented to reflect both access frequency and the resulting i-pRAM action. In this context, "access" means that a storage location with a given address has been accessed, "activity" means that when the storage location was accessed it resulted in the pRAM firing (i.e. a 1 at its output), and "inactivity" means that when the storage location was accessed it did not result in the pRAM firing (i.e. a 0 at its output). The trace $e_u$ in counters or integrators [23] records the number of numbers of occasions on which there was "access and activity" for each given storage location, whilst the trace $f_u$ recorded in counters or integrators [24] records the number of occasions on which there was "access and inactivity" for each given storage location (both are equally important in developing an appropriate response to a changing environment). As in FIG. 5, counter or integrator [22] records the total number of times each storage location was accessed. The eligibility traces are initialised to zero at the start of a task, and subsequently updated so that at a time t they have the values $$e_u(t)=\delta e_u(t-1)+\overline{\delta}a(t)X_u(t) \quad (9a)$$

$$f_u(t)=\delta f_u(t-1)+\overline{\delta}\overline{a}(t)X_u(t) \quad (9b)$$

where δ is a selected constant, $0 \leq \delta < 1$, and $\overline{\delta}=1-\delta$. FIG. 7 shows the mechanism whereby the eligibility trace $e_u$ is updated according to equation 9a showing that this feature is hardware-realisable. The current value of $e_u$ is read from the port [26] and multiplied by the eligibility trace decay rate, δ at [28] using a multiplier [13]. This product is combined using an adder [12] with the product of the pRAM output, a(t) [4], the access count data, $X_u$ [25] and the complement of the decay rate, $\overline{\delta}$ [29] before written back as $e_u$ [23] using the write port [27]. This implements equation 9a.

Updating the $f_u$ term is identical to that above except that it is the inverse of the output, a(t), which is used to implement the equation 9b.

The necessary extension of equation (8), which results in the capacity to learn about temporal features of the environment, is $$\Delta\alpha_u(t) = \rho((\overline{\alpha}_u e_u - \alpha_u f_u) r + \lambda(\overline{\alpha}_u f_u - \alpha_u e_u) p)(t) \quad (10)$$

When $\delta=0$, $e_u=aX_u$, $f_u=\overline{a}X_u$, it may be seen that (10) reduces to the original learning i-pRAM training rule (8).

Figure 8:
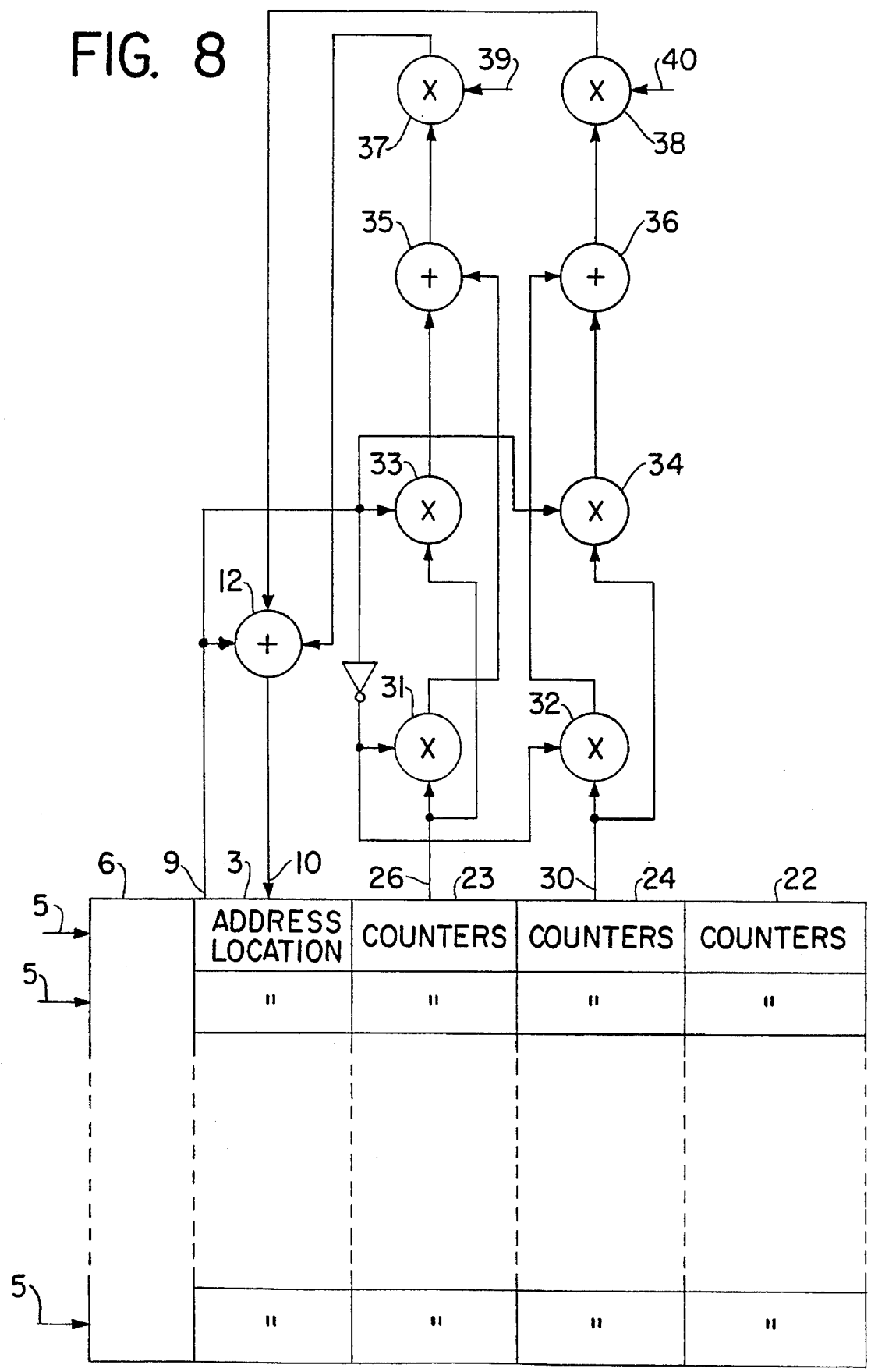
FIG. 8 shows the further modifications needed to implement Equation 10 (for which see below)
Figure 9:
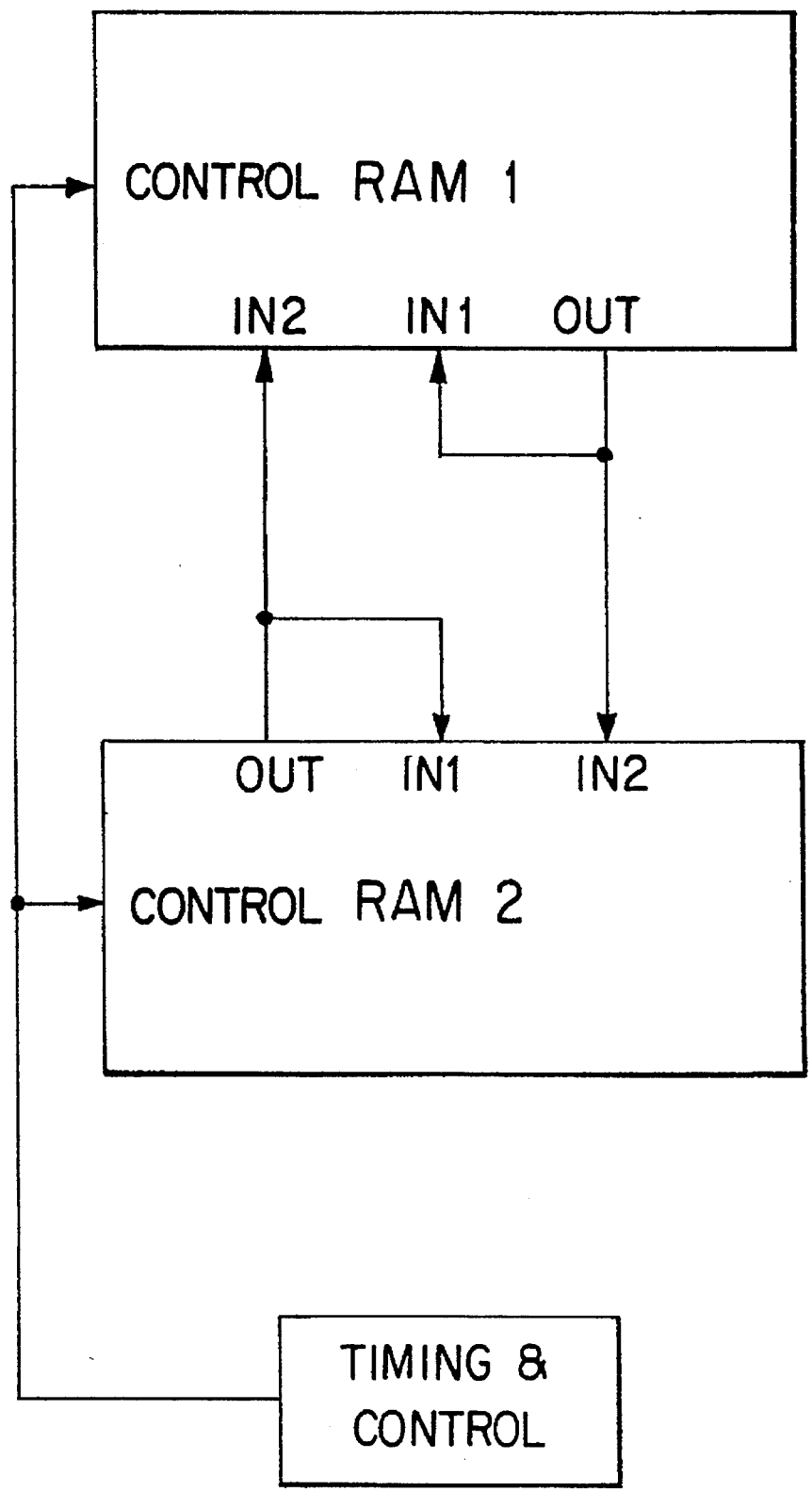
FIG. 9 shows a simple neural network using two pRAMs.
Figure 10A:
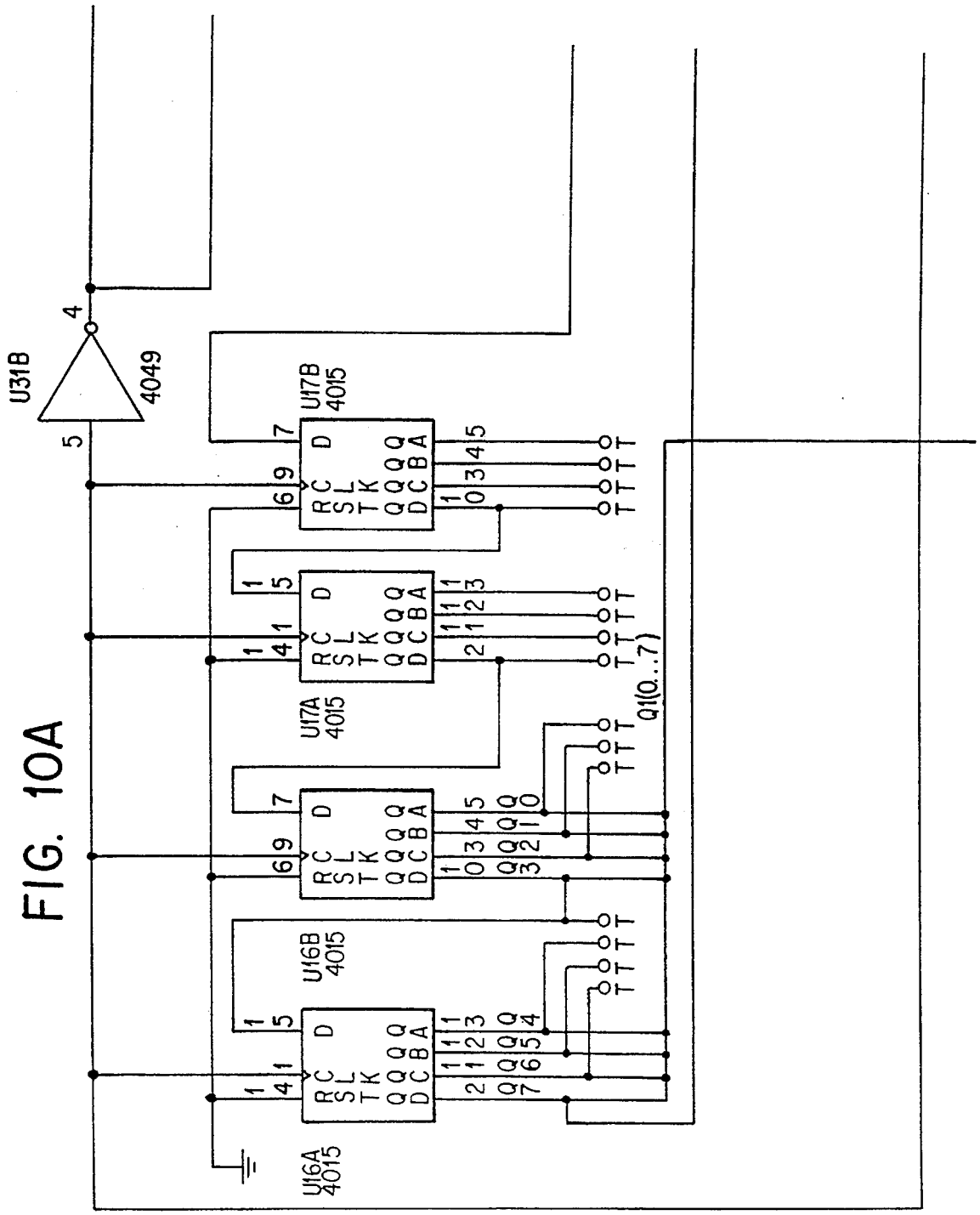
FIG. 10A, 10B, 10C and 10D taken together, show a circuit diagram showing one of the pRAMs of FIG. 9 in detail, FIG. 10B being a continuation of the right side of FIG. 10A, FIG. 10C being a lower continuation of FIG. 10A, and FIG. 10D being a right continuation of FIG. 10C and a lower continuation of FIG. 10B
Figure 10B:
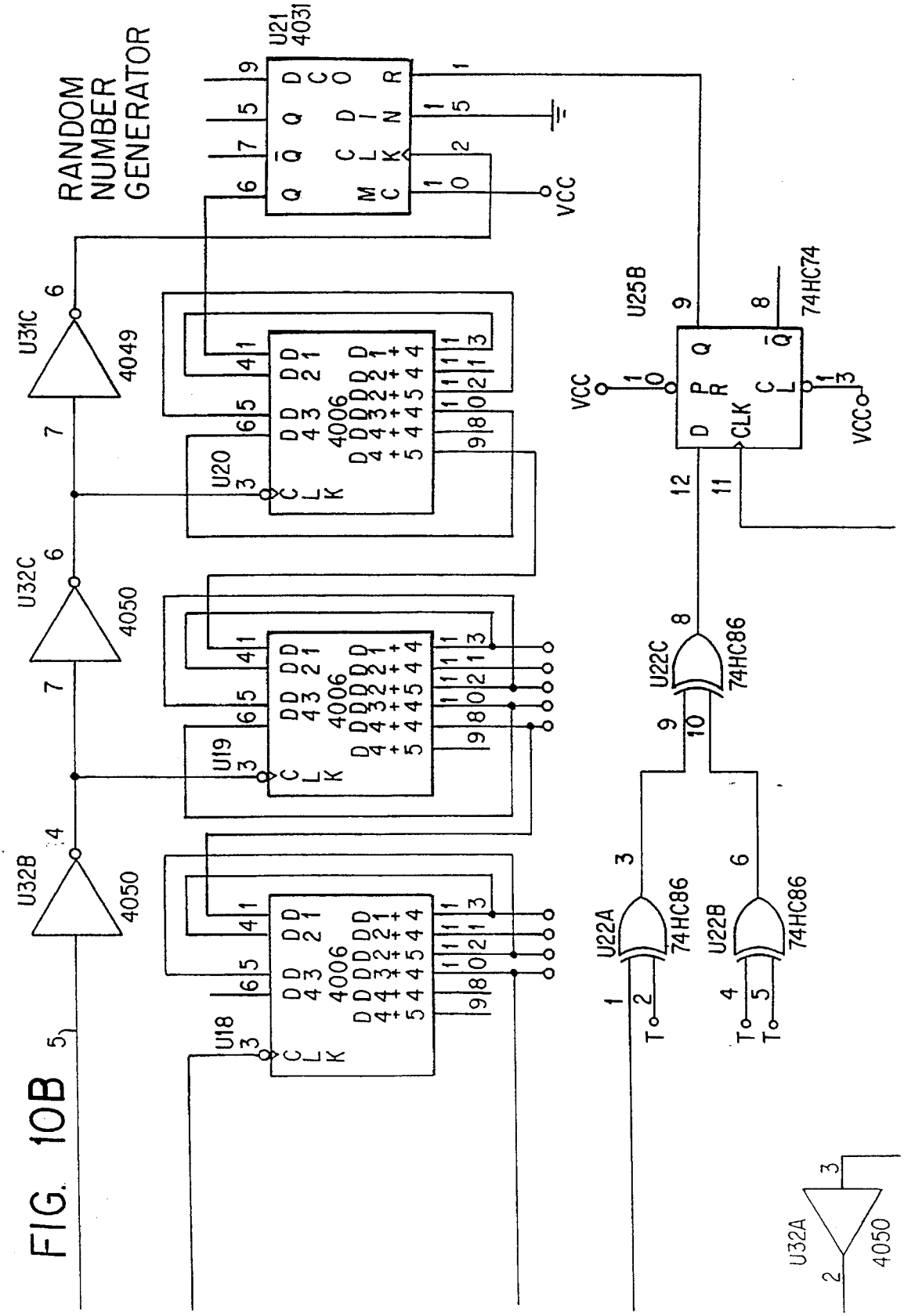
Figure 10C:
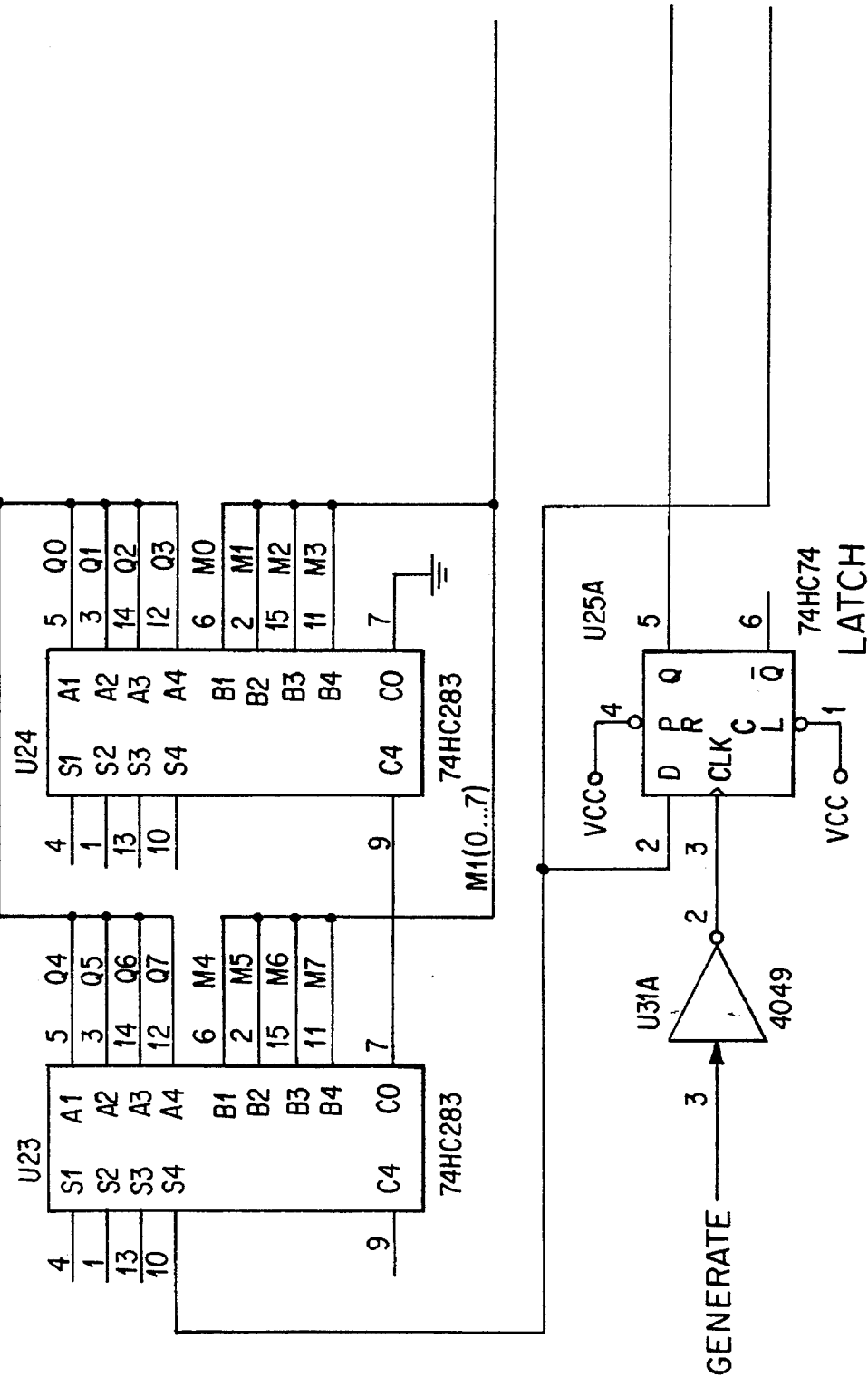
Figure 10D:
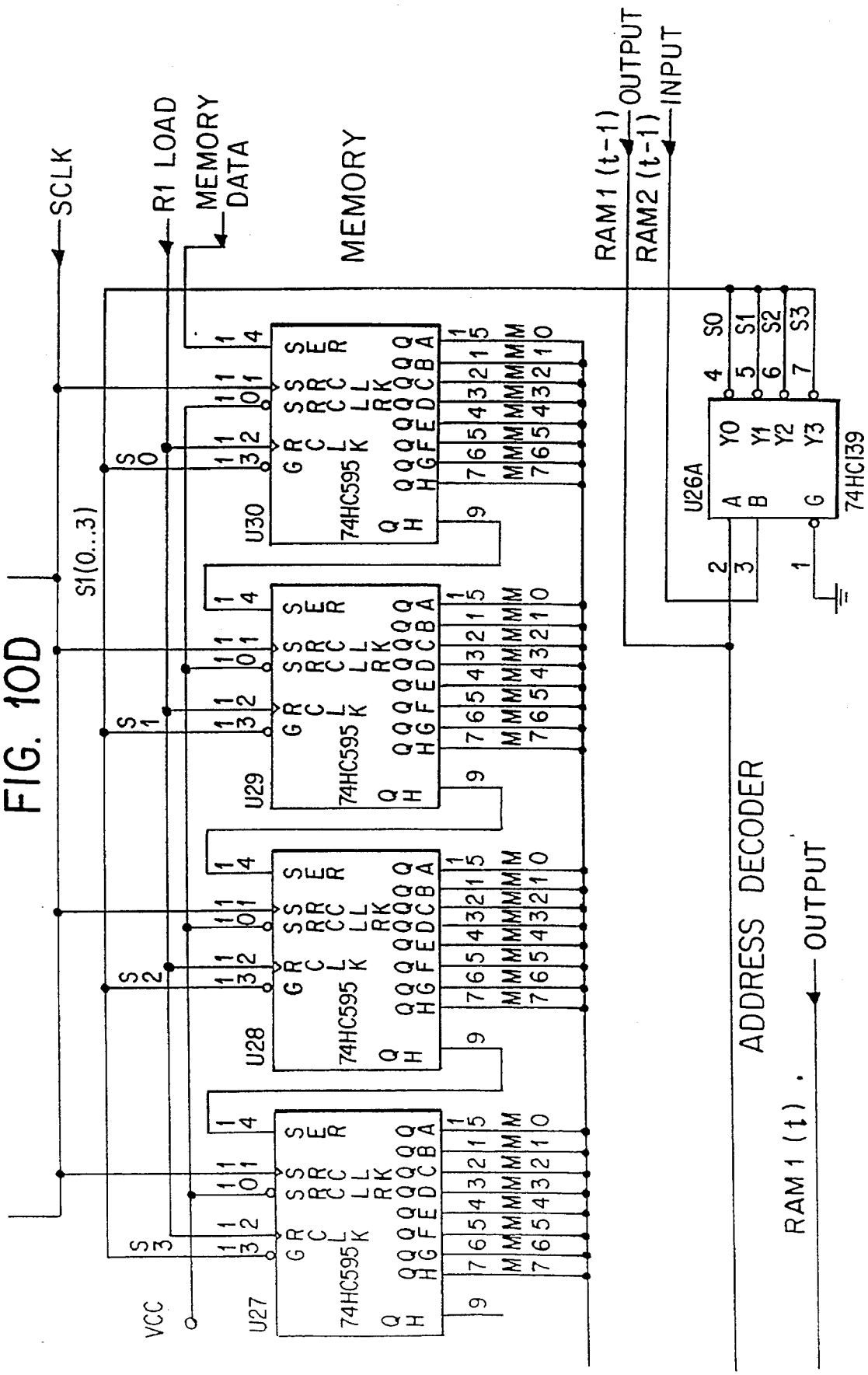
Figure 11:
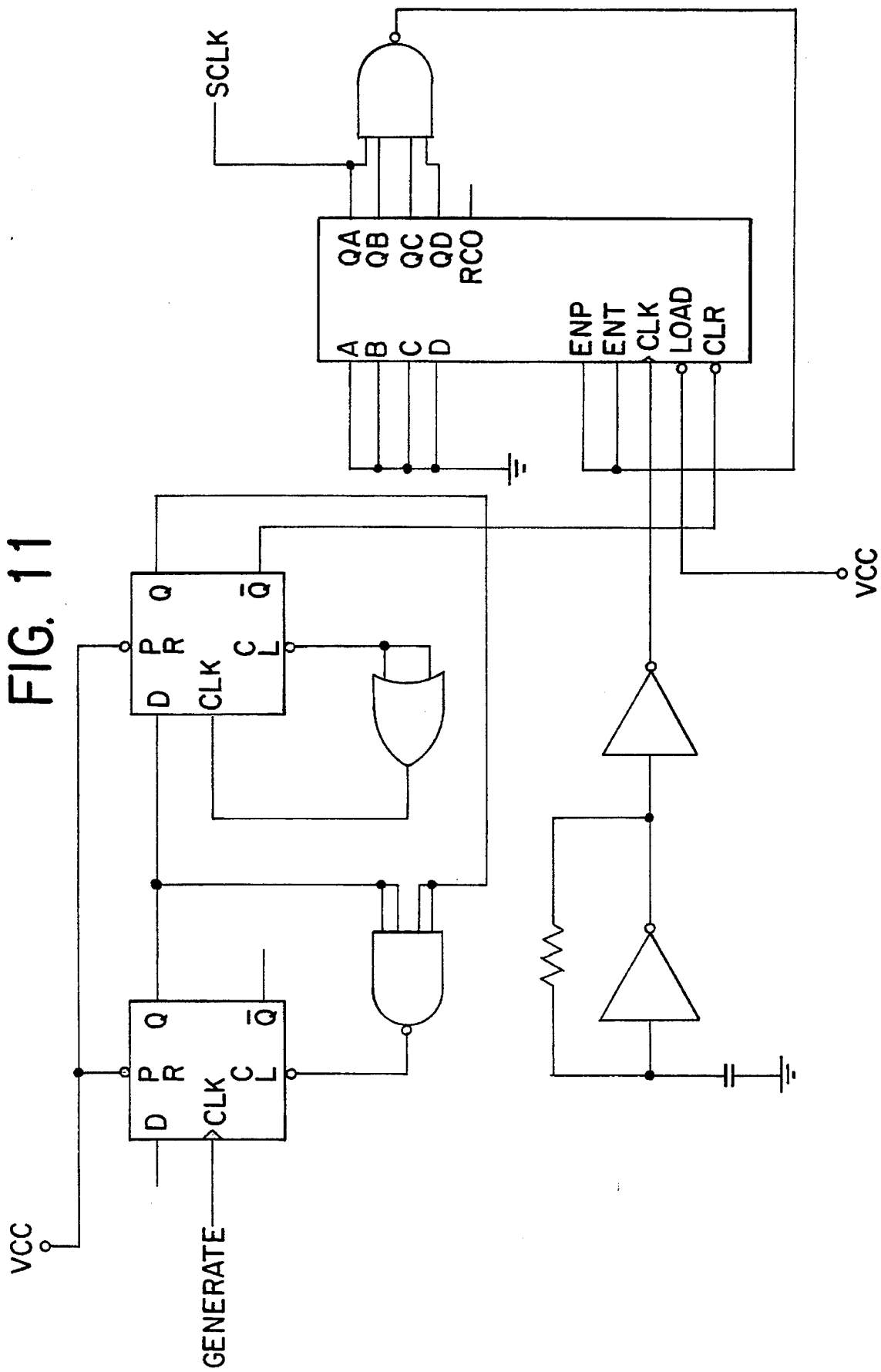
FIG. 11 is a circuit diagram showing the timing and control circuitry used in FIG. 9.

In addition to updating the eligibility traces (shown in FIG. 7) the memory contents, $\alpha_u$ are modified so that learning behaviour may be implemented. FIG. 8 shows the operations required in addition to those of FIG. 7 in order to implement equation 10. Multiplier [31] forms the product of $e_u$ and $\overline{\alpha}_u$ and multiplier [32] forms the product of $f_u$ and $\overline{\alpha}_u$. Multiplier [33] forms the product of $e_u$ and $\alpha_u$ and multiplier [34] forms the product of $f_u$ and $\alpha_u$. The product formed by multiplier [33] is subtracted from the product formed by multiplier [32] in the subtractor [35]. The product formed by multiplier [34] is subtracted from the product formed by multiplier [31] in the subtractor [36]. The output of the subtractor [35] is multiplied by a penalty factor p which is an input from the environment to the multiplier [37] at [39]. The output of the subtractor [36] is multiplied by a reward factor r which is an input from the environment to the multiplier [38] at [40]. The outputs of the multipliers [37] and [38] are added to the original memory contents at [19] using the adder [12]. The output from the adder [12] is written back into the memory using the write port [10] and the memory is thereby updated. The operations described implement the training rule described in equation 10.

An alternative to the training rule of equation (8) is a rule which may take account more realistically of the behaviour of the whole i-pRAM. This alternative is expressed by $$\Delta\alpha_u^{(i)} = \rho\{[\overline{\alpha}_u^{(i)}g)a_i - (\alpha_u^{(i)}g)\overline{a}_i]r + \lambda[(\overline{\alpha}_u^{(i)}g)\overline{a}_i - (\alpha_u^{(i)}g)a_i]p\}X_u$$

where g is a suitable function of $$\sum_u \alpha_u X_u$$

such as, for example, $$g(x) = \frac{1}{1 + e^{-\beta(x-\theta)}}$$

Where eligibility traces are added, this becomes $$\Delta\alpha_u^{(i)} = \rho\{[(\overline{\alpha}_u^{(i)}g)e_u - (\alpha_u^{(i)}g)f_u]r + \lambda\,[(\overline{\alpha}_u^{(i)}g)f_u - (\alpha_u^{(i)}g)e_u]p\}$$

In the various aspects of the invention described herein, the devices are described as being realised in dedicated hardware. It will be appreciated that the invention can alternatively be realised in software, using a conventional digital computer to simulate the hardware described, and the present application is intended to encompass that possibility. However, software simulation is unlikely to be practical except for very small networks and the hardware approach is much more practical for larger and therefore more interesting networks.

Also is should be noted that other hardware realisations are possible, for example using VLSI technology.

We claim:

1. A device for use in a neural processing network, comprising a memory having a plurality of storage locations at each of which a number representing a probability is stored; means for selectively addressing each storage location of said plurality of storage locations as an addressed storage location to cause the contents of the addressed storage location to be written to a comparator; a noise generator for inputting to the comparator a random number representing noise; means for causing to appear at an output of the comparator an output signal having a first or second value depending on the values of the numbers received from the addressed storage location and the noise generator, the probability of the output signal having a given one of the first and second values being determined by the number at the addressed storage location; and a plurality of trace counters each corresponding to a respective one of the storage locations, said trace counters each having contents that are subject to an increment on each occasion when both the corresponding storage location is accessed and the output signal of the comparator has the first value, the addressed storage locations storing values of numbers that are increased or decreased in dependence on the contents of said trace counters.

2. A device according to claim 1, wherein the contents of said trace counters are subject to a decay factor each time any of the storage locations is accessed.

3. A device according to claim 2, comprising an address counter for each of the storage locations and for counting the number of times each respective one of the storage locations is addressed.

4. A device according to claim 3, wherein each of said trace counters has as the contents $e_u(t)$ at time t given by $$e_u(t) = \delta e_u(t-1) + \overline{\delta} a(t) X_u(t)$$

where $\delta$ is a selected constant, $0 \leq \delta < 1$, and $\overline{\delta}=1-\delta$, a is the output of the comparator and $X_u(t)$ is the frequency with which location u is addressed, as counted by the respective address counter.

5. A device according to claim 1, wherein said trace counters comprise first trace counters, said device further comprising a plurality of second trace counters each corresponding to a respective one of the storage locations, said second trace counters each having contents subject to an increment on each occasion when both the corresponding storage location is accessed and the output signal of the comparator has the second value, the addressed storage locations storing values of numbers that are increased or decreased in dependence on the contents of said first and second trace counters.

6. A device according to claim 5, wherein the contents of the said second trace counters are subject to a decay factor each time any of the storage locations is accessed.

7. A device according to claim 6, comprising an address counter for each storage location and for counting the number of times each respective one of the storage locations is addressed.

8. A device according to claim 7, wherein the contents $f_u(t)$ of said second trace counters at time t are given by $$f_u(t) + \delta f_u(t-1) + \overline{\delta} a(t) X_u(t)$$

where $\delta$ is a selected constant, $0 \leq \delta < 1$, and $\overline{\delta}=1-\delta$, a is the output of the comparator and $X_u(t)$ is the frequency with which location u is accessed, as counted by a respective one of the address counters.

9. A device according to claim 8, wherein the increase or decrease, $\Delta\alpha_u(t)$, in the value of the number stored at a given location is given by the equation:

$$\Delta\alpha_u(t) = \rho((\overline{\alpha}_u e_u - \alpha_u f_u) r + \lambda(\overline{\alpha}_u f_u - \alpha_u e_u) p)(t)$$

where r and p are reward and penalty factors respectively and ρ is a constant.

10. A device according to claim 1, in which said memory includes address lines and further comprising a real-number to digital converter which receives a plurality of real-valued numbers each in the range of 0 to 1 and produces at its output a corresponding plurality of parallel pulse trains which are applied to respective ones of the address lines of the memory to define a succession of storage location addresses, the probability of a pulse representing a 1 being present in an address on a given address line being equal to the value of the real-valued number from which the pulse train applied to that address line was derived; and an integrator for integrating the output signal from the comparator.

11. A device according to claim 10, further comprising an output generator connected to the integrator and having an output at which a given one of two values appears as a function of an integrated value produced by the integrator.

12. A device according to claim 11, wherein the output generator contains a look-up table for generating the given one of the two values as a function of the integrated value produced by the integrator.

13. A device according to claim 10, wherein the random number and the numbers at the storage locations have the same number of bits, and wherein the comparator is operable to add the values of the random number received and the number received from one of the addressed storage locations, the output signal having the said first or second value depending on whether or not the addition results in an overflow bit.

14. A device according to claim 1, comprising means for receiving signals from an environment, the signals representing success or failure of the network; means for changing the value of the number stored at the addressed storage location if a success signal is received, in such a way as to increase the probability of a successful action; and means for changing the value of the number stored at the addressed storage location if a failure signal is received, in such a way as to decrease the probability of an unsuccessful action.

15. A device according to claim 1, wherein the memory is a random access memory.

16. A device for use in a neural processing network, comprising a memory having address lines and a plurality of storage locations at each of which a number representing a probability is stored; a real-number to digital converter which receives a plurality of real-valued numbers each in the range of 0 to 1 and produces at its output a corresponding plurality of synchronized parallel pulse trains which are applied to respective address lines of the memory as a succession of storage location addresses, thereby to selectively address each storage location of said plurality of storage locations as an addressed storage location the probability of a pulse representing a 1 being present in an address on a given address line being equal to the value of the real-valued number from which was derived an applied one of the pulse trains to that address line; a comparator for successively receiving as an input the numbers stored at each of the addressed storage locations; a noise generator for inputting to the comparator a succession of random numbers, representing noise; means for causing to appear at an output of the comparator a succession of output signals each having a first or second value depending on the values of the numbers received from the addressed storage locations and the noise generator, the probability of the output signal having a given one of the first and second values being determined by the number at one of the addressed storage locations; an integrator for integrating the output signals from the comparator; means for receiving signals from an environment, the signals representing a successful action or an unsuccessful action by the network; means for changing the value of the numbers stored at the addressed storage locations if a success signal is received, in such a way as to increase the probability of the successful action; means for changing the value of the number stored at the addressed storage locations if a failure signal is received, in such a way as to decrease the probability of the unsuccessful action; an address counter for counting the number of times each of the storage locations is addressed; and means for increasing or decreasing the values of the numbers stored at the addressed storage locations in dependence on the number of times each of the storage locations is addressed, as counted by the address counter; and two further counters for each of the storage locations, one of said further counters having contents subject to an increment on each occasion when the storage location is addressed and the output signal of the device has the first value, and the other of said further counters having contents subject to an increment on each occasion when the storage location is addressed and the output signal of the device has the second value, the contents of both said further counters being subject to a decay factor each time any storage location is accessed, the values of the numbers stored at the addressed storage locations being increased or decreased in dependence on the contents of said further counters.

17. A device according to claim 16, wherein the contents $e_u(t)$ and $f_u(t)$ of the said further counters at time t are given by $$e_u(t)=\bar{\delta} e_u(t-1)+\delta a(t)X_u(t)$$

$$f_u(t)=\bar{\delta} f_u(t-1)+\delta a(t)X_u(t)$$

where δ is a selected constant, $0 \leq \delta < 1$, $\bar{\delta}=1-\delta$, a is the output of the comparator and $X_u(t)$ is the frequency with which location u is addressed, as counted by the respective address counter.

18. A device according to claim 17, wherein the increase or decrease, $\Delta\alpha_u(t)$, in the value of the number stored at a given location is given by the equation:

$$\Delta\alpha_u(t)=\rho((\bar{\alpha}_u e_u - \alpha_u f_u)r + \lambda(\bar{\alpha}_u f_u - \alpha_u e_u)p)(t)$$

where r and p are reward and penalty factors respectively and ρ is a constant.

19. A device according to claim 18, wherein the memory is a random access memory.

20. A device according to claim 16, wherein the memory is a random access memory.

* * * * *